US008856103B2

(12) United States Patent
Barber et al.

(10) Patent No.: US 8,856,103 B2
(45) Date of Patent: *Oct. 7, 2014

(54) PREDICATE PUSHDOWN WITH LATE MATERIALIZATION IN DATABASE QUERY PROCESSING

(75) Inventors: Ronald J. Barber, San Jose, CA (US); Lin Qiao, San Jose, CA (US); Vijayshankar Raman, Sunnyvale, CA (US); Richard S. Sidle, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/587,377

(22) Filed: Aug. 16, 2012

(65) Prior Publication Data

US 2014/0006382 A1    Jan. 2, 2014

Related U.S. Application Data

(63) Continuation of application No. 13/537,665, filed on Jun. 29, 2012.

(51) Int. Cl.
*G06F 7/00*        (2006.01)

(52) U.S. Cl.
USPC ......................................................... 707/718

(58) Field of Classification Search
USPC ........... 707/705, 713, 718, 719, 720, 999.002
See application file for complete search history.

(56) References Cited

U.S. PATENT DOCUMENTS

| | | | | |
|---|---|---|---|---|
| 4,956,774 | A | * | 9/1990 | Shibamiya et al. .................... 1/1 |
| 5,590,362 | A | * | 12/1996 | Baum et al. ............................ 1/1 |
| 5,987,453 | A | * | 11/1999 | Krishna et al. ........................ 1/1 |
| 6,341,281 | B1 | * | 1/2002 | MacNicol et al. ..................... 1/1 |
| 6,564,212 | B2 |  | 5/2003 | Koskas |
| 6,738,755 | B1 | * | 5/2004 | Freytag et al. ........................ 1/1 |
| 7,171,427 | B2 | * | 1/2007 | Witkowski et al. ................... 1/1 |
| 7,953,726 | B2 |  | 5/2011 | Purcell |
| 7,958,113 | B2 |  | 6/2011 | Fan et al. |
| 8,032,499 | B2 | * | 10/2011 | Faerber et al. ................. 707/693 |
| 2002/0095397 | A1 | * | 7/2002 | Koskas ............................ 707/1 |
| 2003/0212694 | A1 | * | 11/2003 | Potapov et al. ............... 707/100 |
| 2006/0093222 | A1 | * | 5/2006 | Saffer et al. .................... 382/224 |
| 2007/0136346 | A1 | * | 6/2007 | Morris et al. ................. 707/101 |
| 2009/0006399 | A1 | * | 1/2009 | Raman et al. .................... 707/7 |
| 2010/0005077 | A1 | * | 1/2010 | Krishnamurthy et al. ........ 707/4 |
| 2010/0030748 | A1 | * | 2/2010 | Netz et al. ......................... 707/3 |

(Continued)

OTHER PUBLICATIONS

IBM, "<QMProject> Method of Recommending a Consolidated Set of Materialized Query Tables," Feb. 24, 2010, pp. 1-4, IBM Corporation, USA.

(Continued)

*Primary Examiner* — Mohammed R Uddin
(74) *Attorney, Agent, or Firm* — Kenneth L. Sherman, Esq.; Michael Zarrabian, Esq.; Sherman & Zarrabian LLP

(57) ABSTRACT

Embodiments of the present invention provide query processing for column stores by accumulating table record attributes during application of query plan operators on a table. The attributes and associated attribute values are compacted when said attribute values are to be consumed for an operation in the query plan, during the execution of the query plan. Table column record values are materialized late in query plan execution.

10 Claims, 6 Drawing Sheets

(56) References Cited

U.S. PATENT DOCUMENTS

| | | | |
|---|---|---|---|
| 2010/0281004 A1* | 11/2010 | Kapoor et al. | 707/693 |
| 2011/0060731 A1* | 3/2011 | Al-Omari et al. | 707/718 |
| 2012/0054225 A1* | 3/2012 | Marwah et al. | 707/769 |
| 2012/0084278 A1* | 4/2012 | Franke et al. | 707/719 |
| 2013/0275364 A1* | 10/2013 | Wang et al. | 707/602 |
| 2013/0282650 A1* | 10/2013 | Zhang et al. | 707/605 |

OTHER PUBLICATIONS

Grund, M. et al., "Optimal Query Operator Materialization Strategy for Hybrid Databases," Proceedings of the 2011 Third International Conference on Advances in Databases, Knowledge, and Data Applications (DBKDA '11), 2011, pp. 169-174, International Academy, Research, and Industry Association (IARIA), USA.

Abadi, D.J. et al., "Materialization Strategies in a Column-Oriented DBMS," Proceedings of the 2007 IEEE 23rd International Conference on Data Engineering (ICDE '07), Apr. 2007, pp. 466-475, IEEE, USA.

Padmanabhan, S. et al., "Block Oriented Processing of Relational Database Operations in Modern Computer Architectures," Proceedings of the 2001 IEEE 17th International Conference on Data Engineering (ICDE '01), 2001, pp. 567-574, IEEE, USA.

Dai, X. et al., "The Application of Materialization Strategies on OLAP in Column Oriented Database Systems," Proceedings of the 2011 IEEE 3rd International Conference on Communication Software and Networks (ICCSN '11), 2011, pp. 305-308, IEEE, USA.

U.S. Non-Final Office Action for U.S. Appl. No. 13/537,665 mailed Aug. 6, 2013.

U.S. Notice of Allowance for U.S. Appl. No. 13/537,665 mailed Jun. 9, 2014 by Examiner Mohammed R. Uddin.

U.S. Notice of Allowability for U.S. Appl. No. 13/537,665 mailed Aug. 14, 2014 by Examiner Mohammed R. Uddin.

\* cited by examiner

70

Details: Example Query:
SELECT A
FROM T
WHERE B>5

Sequence:

1. Column B is scanned and predicate applied. Flow TSNs of qualifying tuples.

2. For each qualifying tuple from step 1:
   - Access appropriate value of column A, using TSN

PREDICATE PUSHDOWN WITH LATE MATERIALIZATION IN DATABASE QUERY PROCESSING

CROSS-REFERENCE TO RELATED APPLICATIONS

This patent application is a continuation patent application of U.S. patent application Ser. No. 13/537,665, filed on Jun. 29, 2012, the disclosure of which is incorporated herein its entirety by reference.

FIELD OF THE INVENTION

The present invention generally relates to query processing and in particular to query processing involving predicate pushdown with late materialization.

BACKGROUND

Conventional database query processing involves application of predicates on data as early as possible, so that subsequent operators operate on less data. However, such processing has a conflict with recent trends towards column stores (i.e., tables with column-major layout). In a column store, all columns of a table are not fetched at once when a table is scanned, instead, each column is fetched as needed.

BRIEF SUMMARY

Embodiments of the present invention provide query processing for column stores by accumulating table record attributes during execution of query plan operators on a table. The attributes and associated attribute values are compacted during the execution of the query plan. Table column record values are materialized late in query plan execution.

In one embodiment, query process further comprises accumulating and compacting attribute records and associated attribute values during execution of a query plan, wherein compacting is independent of branch flow. In one embodiment, compacting of an attribute includes forming an array of values for that attribute that contains only entries for those rows that satisfy a specific set of query predicates.

In one embodiment, selectivity of the query is determined during execution of query plan operators. In one embodiment, low-selectivity predicates are compacted differently than high-selectivity predicates. In one embodiment, different query execution plans are generated based on said selectivity. In one embodiment compacting comprises employing a compaction algorithm that is branch-free and has reduced loop control instructions. In one embodiment, hardware processor instructions for efficient compaction are utilized when predicates are highly selective.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
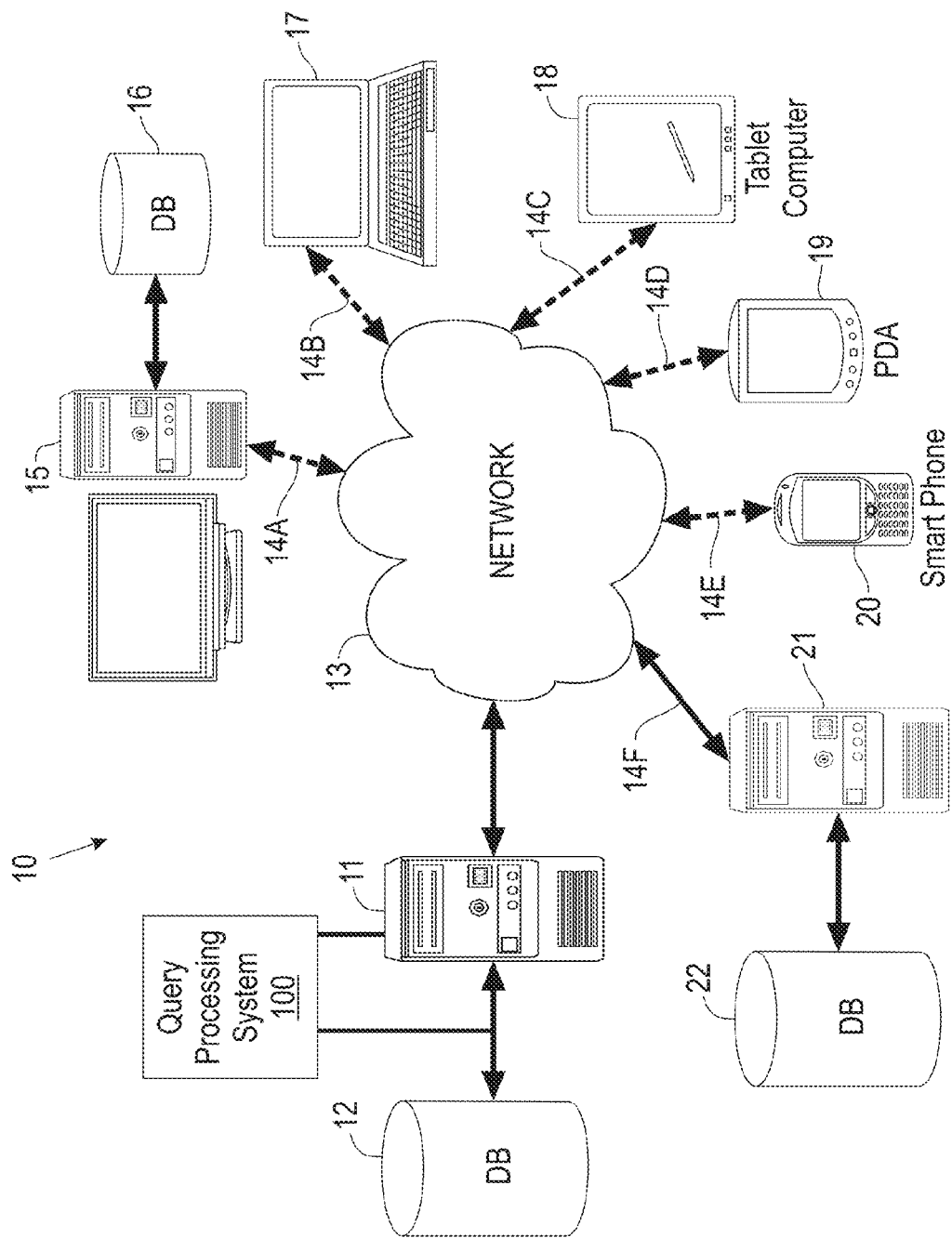
FIG. 1 is a block diagram illustrating an example of the network environment for query processing, according to an embodiment of the present invention.

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

One or more exemplary embodiments of the invention are described below in detail. The disclosed embodiments are intended to be illustrative only since numerous modifications and variations therein will be apparent to those of ordinary skill in the art.

Generally database query processing involves application of predicates on data as early as possible, so that subsequent operators operate on less data. In one example, a fact table F is joined with dimension tables A, B in a query as follows:

select sum(F.value) from F, A, B group by A.x, B.y where F.F_A=A.key and F.F_B=B.key If the query plan joins F with A first, then after the join, only the qualifying rows (those rows of F that have matches in the join with A) are sent to the join operator for the join with B.

In one embodiment the present invention provides database query processing comprising predicate pushdown with late materialization. One implementation comprises compacting vectors on demand, wherein attributes are accumulated gradually as query plan operators are applied, and attributes are compacted when needed. In one embodiment, compacting of an attribute involves forming an array of values for that attribute that contains only entries for those rows that satisfy a specific set of query predicates.

Column stores materialize column values late in query execution. In the above example, before F is joined with A, the foreign key of F for this join (F_A) is fetched. However, F_B is only fetched after the join, and only for those rows of F that pass the join with A. Such late materialization has significant performance advantages.

Many query processors operate in vectorized form, wherein the intermediate state that flows through a query plan involves arrays of values for multiple records, rather than the value for a single record. For example, when F_B is fetched, the query processor has an array of F_B values for each of those tuples that pass the join with A (this is typically performed for a buffer of tuples at a time). The join with B produces an array of B.y values corresponding to the F_B array, both having the same size, wherein the $i^{th}$ entry of the B.y array is for the same output record as the $i^{th}$ entry of the F_B array.

However, a challenge is that the array of F_A values (and the array of A.x values) do not directly correspond to the B.y values array because they (the former) include values that do not pass the join with A. As such it is not possible to positionally "stitch" together the A.x and B.y values for the group-by the $i^{th}$ entry of A.x array, as it does not necessarily correspond to $i^{th}$ entry of B.y array.

Some existing query processing approaches avoid this problem by operating on individual values instead of in batches. However, this results in function call overheads and lack of Reduced Instruction Set Computing (RISC) parallelism (such as loop unrolling, e.g., to a pre-determined minimum of operations) and poor exploitation of Single Instruction, Multiple Data (SIMD) processing. Other existing approaches defer compaction (i.e., fetch all values of F_B, including those that do not qualify the join with A). However, this results in additional processing on tuples that are irrelevant for the final output. This is exacerbated by a need for common subexpression reuse. Often the same expression is needed at multiple places in the query plan. Reusing the value computed before is difficult because predicates might have been applied in the meanwhile.

In one embodiment the present invention provides query processing for column stores (i.e., tables with column-major layout), by materializing column values late in query execution. The query processing comprises accumulating attributes gradually as query plan operators are applied, and compacting attributes when needed. The compaction algorithms are branch-free and unroll well, in order to take advantage of RISC parallelism on modern processors. By branch-free, it is meant that the compaction is performed on an array of values using a fixed list of processor instructions, without involving branch or conditional instructions. This allows exploitation of RISC parallelism. Furthermore, the compiler can easily unroll the loop over values in this compaction routine, leading to further RISC parallelism (e.g., loop unwinding to increase program execution speed by reducing instructions that control the loop).

In one implementation, the present invention provides compaction algorithms that treat low-selectivity and high-selectivity predicates differently (selectivity is determined dynamically (i.e., during execution of query plan operators on a table), not estimated). In one example, selectivity means that the filter factor when predicates are applied (i.e., the fraction of tuples satisfying the predicate). In one embodiment, such a compaction algorithm employs special hardware processor instructions for efficient compaction when predicates are highly selective.

Referring now to the drawings, FIG. 1 illustrates an example of the basic components of a system 10 utilizing a query processing system 100 implementing predicate push-down with late materialization for database query processing, according to an embodiment of the present invention. The system 10 includes a server 11 and optionally includes the remote devices 15 and 17-20.

Each of the remote devices 15 and 17-20 has applications and can have a local database 16. Server 11 contains applications, and a database 12 that can be accessed by remote device 15 and 17-20 via connections 14(A-F), respectively, over network 13. The server 11 executes applications and may controls access to itself and database 12. The remote device 15 and 17-20 may access the database 12 over a network 13, such as but not limited to: the Internet, a local area network (LAN), a wide area network (WAN), via a telephone line using a modem (POTS), Bluetooth, WiFi, WiMAX, cellular, optical, satellite, radio frequency (RF), Ethernet, magnetic induction, coax, RS-485, the like or other like networks. The server 11 may also be connected to the local area network (LAN) within an organization.

The remote devices 15 and 17-20 may each be located at remote sites. Remote devices 15 and 17-20 include but are not limited to, PCs, workstations, laptops, handheld computers, pocket PCs, PDAs, pagers, WAP devices, non-WAP devices, cell phones, palm devices, printing devices and the like. Included with each remote device 15 and 17-20 is an ability to request information. Thus, when a user at one of the remote devices 15 and 17-20 desires to access information from the database 12 at the server 11, the remote devices 15 and 17-20 communicate over the network 13, to access the server 11 and database 12. Third party computer systems 21 and databases 22 can also be accessed.

Data that are obtained from third party computer systems 21 and database 22 can be stored on server 11 and database 12 in order to provide later access to the user on remote devices 15 and 17-20. It is also contemplated that for certain types of data that the remote devices 15 and 17-20 can access the third party computer systems 21 and database 22 directly using the network 13.

Figure 2:
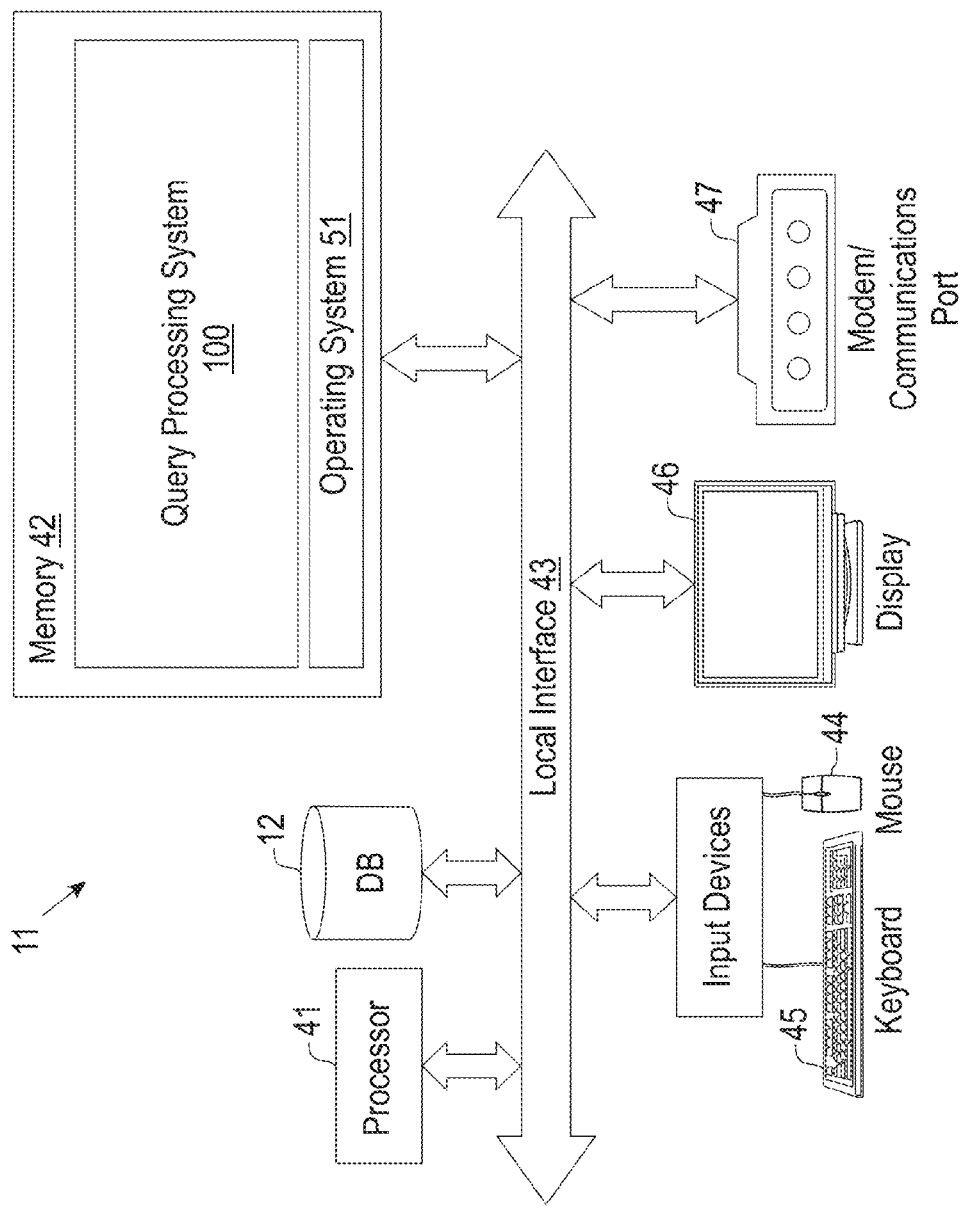
FIG. 2 is a block diagram illustrating an example of a server utilizing query processing, according to an embodiment of the present invention, as shown in FIG. 1.

Illustrated in FIG. 2 is a block diagram demonstrating an example of server 11, as shown in FIG. 1, utilizing the query processing system 100 according to an embodiment of the present invention. Server 11 includes, but is not limited to, database servers, PCs, workstations, laptops, PDAs, palm devices, computer systems, storage servers, and the like. The processing components of the third party computer systems are similar to that of the description for the server 11 (FIG. 2).

Generally, in terms of hardware architecture, as shown in FIG. 2, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., solid-state drives (SSD), read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the query processing system 100 of the present invention. The query processing system 100 comprises functional components and process blocks described further below.

The operating system 51 essentially controls the execution of other computer programs, such as the query processing system 100, and provides scheduling, input/output control, file and data management, memory management, and communication control and related services. However, the query processing system 100 of the present invention is applicable on all other commercially available operating systems.

The query processing system 100 may comprise a source program, executable program (object code), script, or any other entity comprising a set of computer program instructions to be performed. When the query processing system 100 is a source program, then the program is usually translated via a compiler, assembler, interpreter, or the like, which may or may not be included within the memory 42, so as to operate properly in connection with the 0/S 51. Furthermore, the query processing system 100 can be written as (a) an object oriented programming language, which has classes of data and methods, or (b) a procedure programming language, which has routines, subroutines, and/or functions, for example but not limited to, C, C++, C#, Smalltalk, Pascal, BASIC, API calls, HTML, XHTML, XML, ASP scripts, FORTRAN, COBOL, Perl, Java, ADA, .NET, and the like. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), RF or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The system 100 and the O/S 51 are read, in whole or in part, by the processor 41, perhaps buffered within the processor 41, and then executed.

When the query processing system 100 is implemented in software, as is shown in FIG. 2, it should be noted that the query processing system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In an alternative embodiment, where the query processing system 100 is implemented in hardware, the system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the query processing system 100 of the present invention on server 11 and database 12 using for example, but not limited to an Internet browser. The information accessed in server 11 and database 12 can be provided in a number of different forms including but not limited to ASCII data, WEB page data (i.e., HTML), XML or other type of formatted data.

As illustrated, the remote devices 15 and 17-20 are similar to the description of the components for server 11 described with regard to FIG. 2. Herein, the remote devices 15 and 17-20 are referred to as remote devices 15 for the sake of brevity.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

According to an embodiment of the present invention, the query processing system 100 implements query processing comprising dynamically accumulating and compacting attribute records and associated attribute values during execution of a query plan. The attributes are accumulated gradually as query plan operators are applied. Further, the attributes are compacted when needed, wherein the compaction is independent of the branch flow. Further, in one implementation the compaction process uses special hardware instructions for efficient compaction when predicates are highly selective. An embodiment comprises using hardware population count instructions for efficient compaction by rapidly skipping over tuples that have not satisfied query predicates.

An embodiment further comprises dynamically accumulating vectors of attribute values for table records during execution of a query plan. When an attribute value needs to be consumed for an operation in the query plan, the vector of attribute values is compacted to hold only those entries corresponding to records that satisfy all predicates applied until then. When an attribute value is used at multiple places in a query, for a next and subsequent uses of that attribute, the vector of values computed during the first usage of that attribute is reused, by just re-compacted according to the new list of predicates applied.

An implementation of said query processing comprising predicate pushdown with late materialization in database query processing, according to the present invention is described below.

By way of definition, in one implementation a Workunit holds the intermediate state for a range of tuples, and comprises two elements:
:—a TSNList,
:—zero or more Attribute vectors TSNList indicates tuple sequence numbers including sequence numbers in a columnar representation, similar to RecordIDs in traditional database managements systems (DBMSs). These are sequence numbers of those tuples that are active (pass predicates) at that point in the query plan. TSNList is updated as more predicates are applied. TSNList is represented as a bitmap plus a range, wherein the bitmap indicates the active tuples within the range.

Figure 3:
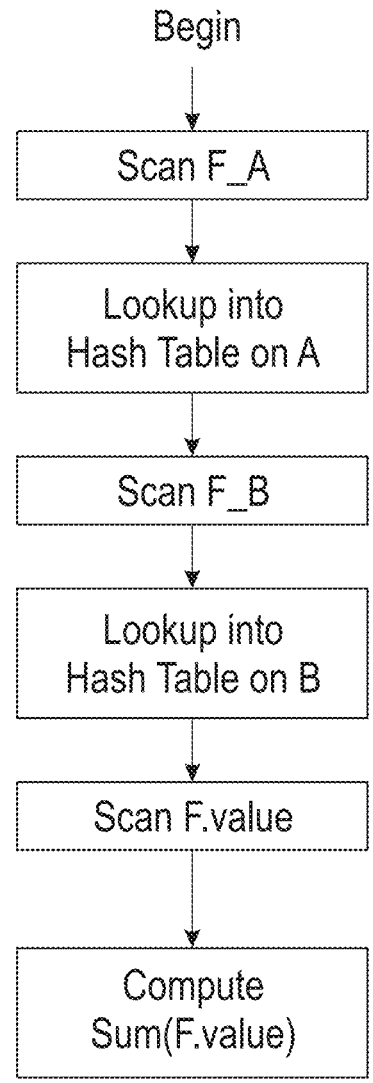
FIG. 3 illustrates an example query processing using compaction, according to an embodiment of the present invention.

Attribute vectors may comprise bit vectors (result of predicates), or value vectors. FIG. 3 illustrates an example query processing 60 according to an embodiment of the invention for the same example query given earlier (i.e., select sum (F.value) from F, A, B group by A.x, B.y where F.F_A=A.key and F.F_B=B.key). Table 1 shows example evaluator and evaluation routines in conjunction with FIG. 3, according to an embodiment of the invention. When an operator first adds an Attribute Vector to a Workunit, it is "compacted" according to the TSNList of the workunit at that time.

TABLE 1

Evaluator and Evaluation Routines

Evaluator: function that operates on a batch of inputs
    Amortizes function call overhead and branch mis-prediction overhead
    Opportunities for SIMD execution
    Nulls, Booleans, etc. handled efficiently as bit-vectors
    Uses templates extensively
Each evaluator chooses its own batch size
    e.g., hash join evaluators need to partition their (probe) input for
    cache efficiency
Evaluation Routine: pipeline of evaluators that executes a query
Data flow between evaluators: What flows is a workunit (range of TSNs).

In FIG. 3, the example evaluation routine comprises 6 evaluators: the first evaluator scans the column of A values from table F and outputs them in batches. The next evaluator uses these values (one batch at a time) to lookup into a hash table on the A.key values. The next evaluator scans F_B values, only those that correspond to tuples that have a match in the join with A. Next evaluator looks up using F_B values into a hash table on the B.key values. The next evaluator scans the F.value column, extracting only values for tuples that have matches in the joins with both A and B. The last evaluator sums up those values.

In an example application to the query example provided further above, when the evaluator loads F_B values, it only loads values for those tuples that satisfy the join predicate with A: such that the F_B attribute vector is compacted up to the TSNList for these qualifying tuples. When the join evaluator adds the B.y attribute vector, it is also compacted to the same extent. However, the F_A and A.x attribute vectors are compacted to a lesser extent because the join with A had not happened at that time. Subsequent evaluators in the evaluation routine work on the same workunit. This allows for simple common subexpression reuse, because the operator can directly access any attributes it needs.

When an evaluator desires to use an attribute, it fetches the attribute vector from the workunit. At this time, the attribute vector is compacted to the current TSNList. As such, if a group-by evaluator accesses A.x, B.y, both are compacted to the TSNList of the final list of qualifying tuples. The compacted representations can be cached so that if another evaluator desired the attributes compacted to the same TSNList, it need not re-compact.

Figure 4:
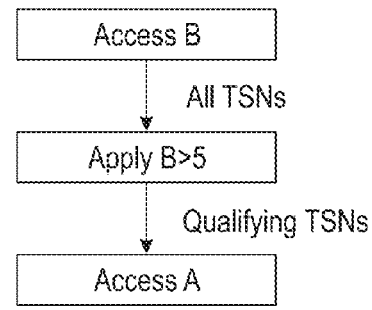
FIG. 4 illustrates an example of late materialization in query processing, according to an embodiment of the invention.

FIG. 4 illustrates an example of late materialization in query processing 70, according to an embodiment of the invention. Columns are accessed only when needed. The process includes carrying TSN with qualifying tuples, and accessing columns via the TSN only when absolutely needed in query processing. This provides savings in not accessing all columns at once, as would be performed in a row store (i.e., saving on accessing rows that did not qualify).

Figure 5:
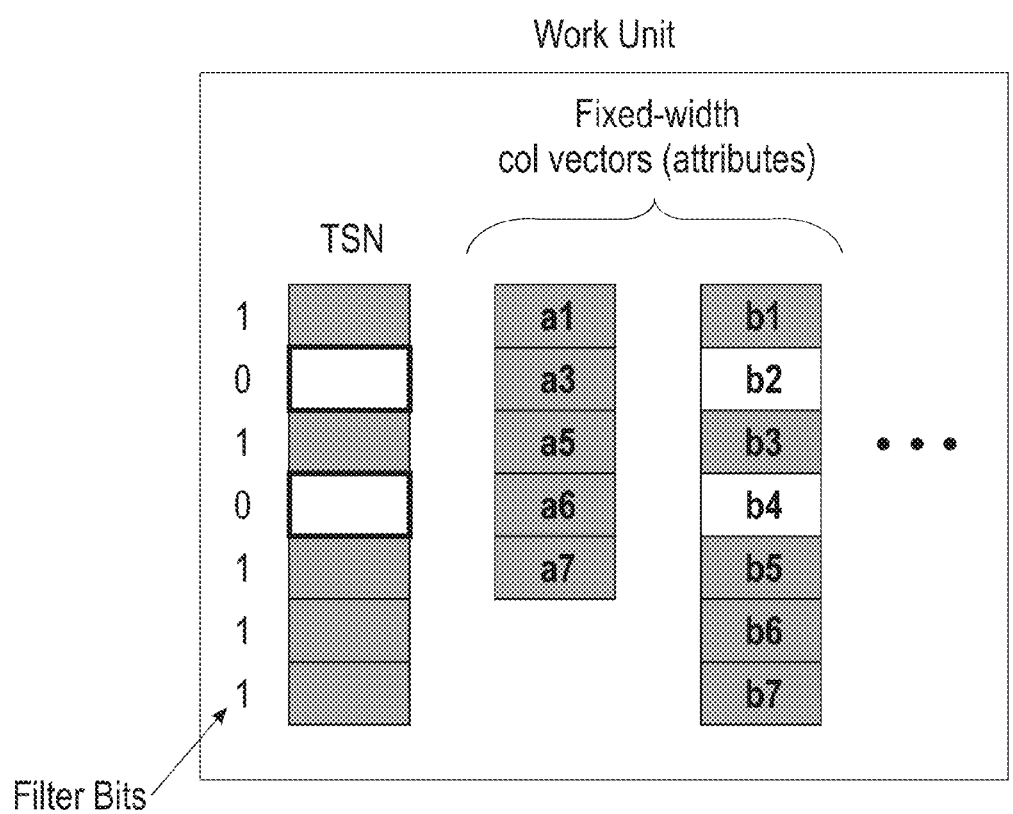
FIG. 5 illustrates an example query processing involving workunits and late materialization, according to an embodiment of the invention.

FIG. 5 illustrates an example query process 80 involving workunits and late materialization as described in Table 2 below, according to an embodiment of the invention. In the example illustrated in FIG. 5, the TSList bitmap is 1010111 wherein there were seven tuples originally (in that batch), out of which only the $1^{st}$, $3^{rd}$, $5^{th}$, $6^{th}$ and $7^{th}$ have satisfied the predicates applied so far. The attribute vector for 'a' values has only five entries for these qualifying tuples because it was loaded after the predicates were applied. The attribute vector for 'b' values has seven entries because it was loaded before the predicates were applied, as such it has vacancies (indicated by bolded rectangles in FIG. 5) for the $2^{nd}$ and $4^{th}$ entry, which represents values for tuples that do not satisfy query predicates. This is what is meant in Table 2 by 'b will be less compacted than a'.

TABLE 2

Workunits and Late Materialization

Intermediate state is stored column-wise, in a workunit
    TSNList: range of Tuple Sequence Numbers (TSN) for a table,
    plus bitmap of valid TSNs
    associated attribute vectors
        attribute = vector of values (plus bitvector for
        nullability)
        workunit picks up more attributes as it flows
        thru more evaluators
    the TSN list is used to drive the I/O for scans or fetches
        parallel evaluator chains work on a disjoint
        range of TSNs
        each thread runs copy of evaluation routine, on
        subset of workunits (work stealing)
Short-circuiting
    TSNList bitmap indicates which tuples are still valid (not
    filtered)
        Allows subsequent evaluators to skip rows
Different attributes are in general compacted to different
levels
    e.g., b was loaded,
    then predicates applied, then a was loaded:
    b will be less compacted than a
    transparent to users Embodiments of the invention provide compaction algorithms that convert vectors from one degree of compaction to another. Generally, a compaction function is of the form of:
    compact(V, origTSNs, newTSNs)

An array V is compacted according to a TSNList origTSNs and is converted to being compacted according to another TSNList newTSNs that may have more predicates applied. In one embodiment, there are two mechanisms depending on whether the bitmaps are sufficiently dense (e.g., threshold of 25% density, i.e., 25% of bits are set to 1, works well). An example compaction pseudo-code for dense bitmaps, according to an embodiment of the invention, is described in Table 3 below.

TABLE 3

Compaction pseudo-code for Dense Bitmaps compactDense(V, origTSNs, newTSNs)
1. Initialize cursors opPos=0 and ipPos=0
2. Go through each word of the bitmaps origTSNs and newTSNs (both are of same size) (we use 64-bit words in our implementation)
{
    3. From = origTSNs.getNextWord( );
    To = new TSNs.getNextWord( );
    4. If the array V does not include null indicators or all the values are non-null
    for each bit within word do:
    {
      V[opPos] <--- V[ipPos]
      if this bit is set in from, increment ipPos by 1
      if this bit is set in to , increment opPos by 1
      (both the above statements are executed without incurring a branch via standard bit-manipulation or conditional move instructions)
    }
    5. Else (V includes a null-indicator bitmap, say V.NULLS)
    for each bit within word do:
    {
      V[opPos] <--- V[ipPos]
      V.NULLS[opPos] <--- V.NULLS[ipPos]
      if this bit is set in from, increment ipPos by 1
      if this bit is set in to , increment opPos by 1
      (both the above statements are executed without incurring a branch via standard bit-manipulation or conditional move instructions)
    }
}

Further a compaction pseudo-code for sparse bitmaps, according to an embodiment of the invention, is described in Table 4 below.

TABLE 4

Compaction pseudo-code for Sparse Bitmaps compactDense(V, origTSNs, newTSNs)
1. Initialize cursors opPos=0 and ipPos=0
2. Use hardware population count instructions to repeatedly find the next bit that is commonly set in both origTSNs and newTSNs (many processors provide a popCount and leadingZeroCount instruction. By applying these on every word of origTSNs and newTSNs we rapidly arrive at the next common bit)
Let Pos be the next bit common in both origTSNs and newTSNs,
Set ipPos to the number of bits set in origTSNs in the range [0..Pos−1]
    (ipPos is incrementally updated using the popCount instruction)
Assign V[opPos] <-- V[ipPos]
If V includes a null-indicator bitmap, V.NULLS[opPos] <-- V.NULLS[ipPos] increment opPos by 1.

Figure 6:
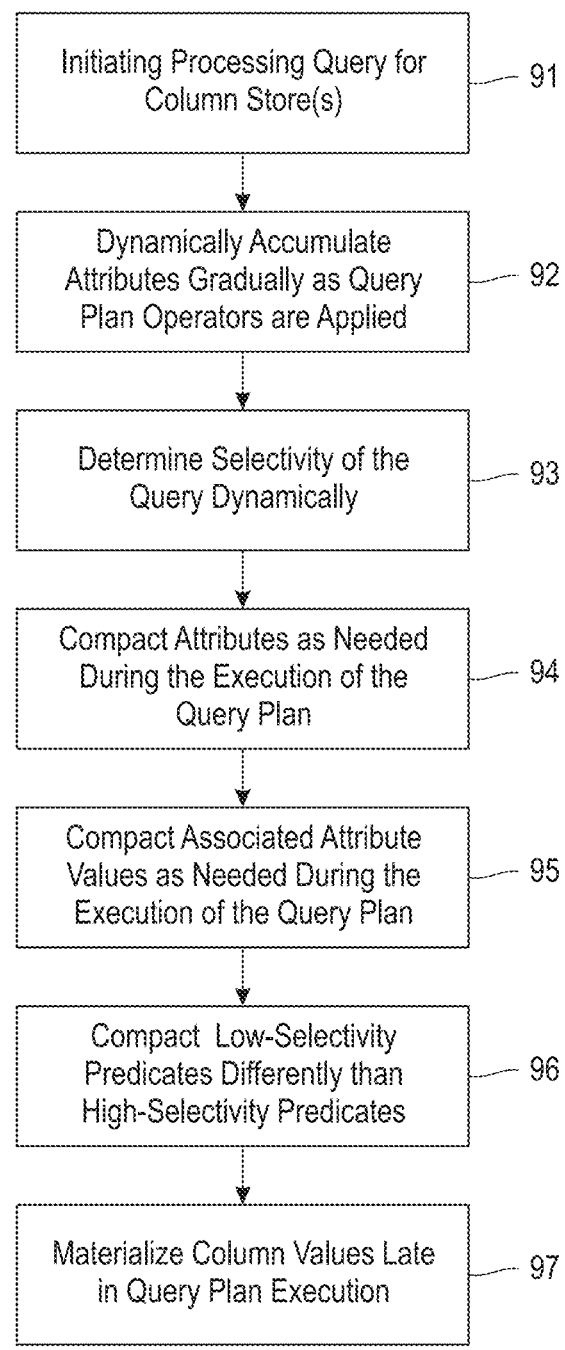
FIG. 6 shows a flowchart illustrating query processing, according to an embodiment of the present invention.

FIG. 6 is a flowchart of a process 90 for the system 100, for processing queries according to an embodiment of the invention. Process block 91 comprises initiating processing query for column store(s). Process block 92 comprises dynamically accumulating attributes gradually as query plan operators are applied. Process block 93 comprises determining selectivity of the query dynamically during the execution of the query plan. Process block 94 comprises determining compacting attributes as needed during the execution of the query plan. Process block 95 comprises compacting associated attribute values as needed during the execution of the query plan. Process block 96 comprises compacting low-selectivity predicates differently than high-selectivity predicates. For example, sparse bitmaps are compacted using a different compaction algorithm than dense bitmaps. Process block 97 comprises materializing column values late in query plan execution.

As such, according to embodiments of the invention, database query processing comprises predicate pushdown with late materialization. Vectors are compacted on demand, wherein attributes are accumulated gradually as query plan operators are applied, and attributes are compacted when needed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method of query processing over database tables laid out in column major order, comprising:
    accumulating table record attributes during application of query plan operators on a table;
    determining selectivity of the query during execution of the query plan operators;
    compacting attributes and associated attribute values when said attribute values are to be consumed for an operation in the query plan during the execution of the query plan, wherein compacting of an attribute comprises forming an array of values for that attribute that contains only entries for those rows that satisfy a specific set of query predicates and performing compaction on the array of values using a fixed list of processor instructions without using branch or conditional instructions; and
    accumulating vectors of attribute values for table records gradually during execution of a query plan as query plan operators are applied, wherein compaction is performed on attributes as needed independent of branch flow, and the vectors of attribute values are compacted on demand;
    when an attribute value is used at multiple places in a query, for a next and subsequent uses of that attribute, reusing the vector of values computed during the first usage of that attribute by re-compacting it according to a new list of predicates applied; and
    materializing table column record values late in query plan execution.

2. The method of claim 1, further comprising:
    when an attribute value needs to be consumed for an operation in the query plan, compacting the vector of attribute values to hold only those entries corresponding to records that satisfy all predicates applied until then.

3. The method of claim 1, further comprising:
    compacting low-selectivity predicates differently than high-selectivity predicates.

4. The method of claim 1, further comprising:
    generating different query execution plans based on said selectivity.

5. The method of claim 1, wherein compacting comprises employing a compaction algorithm that is branch-free and has reduced loop control instructions.

6. The method of claim 1, further comprising:
    utilizing hardware instructions for efficient compaction when predicates are highly selective; and
    utilizing hardware population count instructions for efficient compaction by skipping over tuples that have not satisfied query predicates.

7. A method of query processing over database tables laid out in column major order, comprising:
    accumulating table record attributes and compacting attributes and associated attribute values during execution of query plan operators on a table;
    wherein compacting of an attribute comprises forming an array of values for that attribute that contains only entries for those rows that satisfy a specific set of query predicates and performing compaction on the array of values using a fixed list of processor instructions without using branch or conditional instructions, wherein compacting is independent of branch flow;
    when an attribute value needs to be consumed for an operation in the query plan, compacting a vector of attribute values to hold only those entries corresponding to records that satisfy all predicates applied until then;
    when an attribute value is used at multiple places in a query, for a next and subsequent uses of that attribute, reusing the vector of values computed during the first usage of that attribute by re-compacting it according to a new list of predicates applied; and
    materializing table column record values late in query plan execution.

8. The method of claim 7, further comprising:
    determining selectivity of the query during execution of the query plan operators;

compacting low-selectivity predicates differently than high-selectivity predicates;
and
generating different query execution plans based on said selectivity.

9. The method of claim 7, wherein compacting comprises employing a compaction algorithm that is branch-free and has reduced loop control instructions.

10. The method of claim 7, further comprising:
accumulating vectors of attribute values for table records gradually during execution of the query plan as query plan operators are applied, wherein compaction is performed on attributes as needed independent of branch flow, and the vectors of attribute values are compacted on demand.

* * * * *